United States Patent Office 3,499,010
Patented Mar. 3, 1970

3,499,010
α-(PHENOXYALKYLAMINOMETHYL) 2,3-
DIHYDROBENZOFURANS
Peter Nicholl Green, Pinner, and Maurice Shapero, Edgware, England, assignors to Ward Blenkinsop & Company Limited, Wembley, England, a British company
No Drawing. Filed Dec. 12, 1967, Ser. No. 689,776
Claims priority, application Great Britain, Dec. 15, 1966, 56,316/66
Int. Cl. C07d 5/34
U.S. Cl. 260—396.2                10 Claims

ABSTRACT OF THE DISCLOSURE

Secondary amines are provided which are selected from the group of 2-substituted 2,3-dihydrobenzofurans having the formula

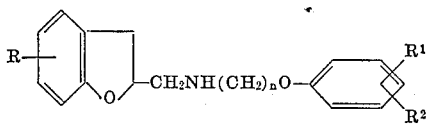

in which each of R, $R^1$ and $R^2$ is a hydrogen or halogen atom or an alkyl or alkoxy group having one to six carbon atoms and n is an integer from two to six. The compounds bring about a fall in blood pressure and possess adrenolytic and adrenergic blocking properties.

This invention relates to the production of pharmacologically valuable 2,3-dihydrobenzofurans.

The present invention provides a 2-substituted 2,3-dihydrobenzofuran having the general formula

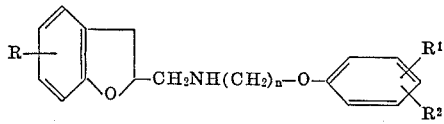

in which each of R, $R^1$ and $R^2$ is a hydrogen or halogen atom or an alkyl or alkoxy group having one to six carbon atoms and n is an integer from two to six.

The substituent R may be in any of the four available positions in the benzene ring of the 2,3-dihydrobenzofuran structure.

The invention also includes the acid addition salts of the said dihydrobenzofurans such as the hydrochloride, hydrobromide, sulphate, lactate, acid tartrate, acid citrate and acid maleate of the said 2,3-dihydrobenzofurans.

According to a feature of the invention 2-substituted 2,3-dihydrobenzofurans having the above general formula may be prepared by reacting a 2-(monosubstituted methyl) 2,3-dihydrobenzofuran having the general formula

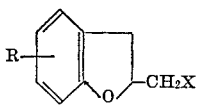

with a phenoxyalkyl compound having the general formula

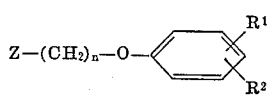

in which formulae R, $R^1$, $R^2$ and n are as above defined, one of X and Z is a halogen atom and the other is a primary amino group. These reactions lead to the production of the hydrohalides of the said dihydrobenzofurans.

Thus the reaction may be between a 2-aminomethyl 2,3-dihydrobenzofuran having the substituent R and a phenoxyalkyl halide having the substituents $R^1$ and $R^2$ or between a 2-halomethyl 2,3-dihydrobenzofuran having the substituent R and a primary phenoxyalkylamine having the substituents $R^1$ and $R^2$. In either case a hydrohalide of the 2-substituted 2,3-dihydrobenzofuran is produced when the reactants are used in substantially equimolar proportions. This hydrohalide may be subsequently decomposed by treating the crude product with an acid acceptor. It is preferred to use an inorganic acid acceptor and to carry out the decomposition in the presence of a solvent for the base being liberated. The bases can subsequently be purified by distillation. On neutralisation with an acid the corresponding salt of the secondary amine is obtained.

The 2-aminomethyl 2,3-dihydrobenzofurans having the substituent R may be produced by reaction of the corresponding 2-halomethyl 2,3-dihydrobenzofuran, such as the bromomethyl compound, with an alkali metal phthalimide in the presence of a dialkyl formamide, such as dimethyl-formamide, to form the corresponding 2-phthalimidomethyl 2,3-dihydrobenzofuran and the latter is then reacted with hydrazine to form the 2-aminomethyl compound (Manske-Inge reaction). Thus there may be used 2-aminomethyl-2,3-dihydrobenzofuran, 2 - aminomethyl-2,3-dihydro-5-methyl-benzofuran, 2 - aminomethyl-2,3-dihydro-6-methylbenzofuran, 2-aminomethyl - 2,3-dihydro-7-methylbenzofuran, 2-aminomethyl-2,3-dihydro-5 - methoxybenzofuran, 2-aminomethyl-2,3-dihydro-5 - chlorobenzofuran, 2-aminomethyl-2,3-dihydro-7-methoxybenzofuran, 2-aminomethyl-2,3-dihydro-7-ethoxybenzofuran, 2-aminomethyl-2,3-dihydro-5-bromobenzofuran, or 2-aminomethyl-2,3-dihydro-7 - fluorobenzofuran. Alternatively, the 2-aminomethyl-2,3-dihydrobenzofurans may be produced by hydrogenative scission of the corresponding 2-benzyl-aminomethyl-2,3 - dihydrobenzofurans having the substituent R in the presence of a catalyst such as Raney nickel or palladium.

The phenoxyalkyl halides used in the process of the present invention employing the 2-aminomethyl-2,3-dihydrobenzofurans have the substituents $R^1$ and $R^2$ present in the benzene ring. These substituents may be present in any position in the benzene ring. Thus an alkyl or alkoxy group having one to six carbon atoms or a halogen atom may be present in either or both of the positions ortho to the group $Z—(CH_2)_nO—$ or one such substituent may be present in a position ortho to the group X and another, which may be like or unlike the first, in the para position to the said group.

Examples of phenoxyalkyl halides having the substituents $R^1$ and $R^2$ which may be used include β-phenoxyethyl chloride and bromide, β-(2-methyl-phenoxy)-ethyl chloride and bromide, β-(2,6-dimethylphenoxy)-ethyl chloride and bromide, β-(2-methoxyphenoxy)ethyl chloride and bromide, β-(2,3-dimethoxyphenoxy)ethyl chloride and bromide, δ-phenoxy-n-butyl chloride and bromide, β-(2,6-dimethoxyphenoxy)ethyl chloride and bromide, β-(2-fluorophenoxy)ethyl chloride and bromide, γ-phenoxypropyl chloride and bromide, and β-(4-methoxyphenoxy)ethyl chloride and bromide.

The 2-halomethyl 2,3-dihydrobenzofurans having the substituent R from which the compounds of the present invention may also be obtained may be synthesised from the corresponding acylated ortho-allylphenols containing the nuclear substituent R by the addition of one molecule of chlorine or bromine thereto to form the corresponding acylated ortho-dichloro- or dibromo-propyl phenols which are then deacylated and ring closure effected by heating with potassium hydroxide. Examples include 2-chloro- and 2 - bromo-methyl-2,3-dihydrobenzofurans, 2-bromomethyl - 2,3-dihydro-5-methylbenzofuran, 2-bromomethyl-2,3 - dihydro-6-methylbenzofuran, 2-chloromethyl-2,3- dihydro - 7 - methylbenzofuran, 2-bromomethyl-2,3-dihydro - 5 - methoxybenzofuran, 2-bromomethyl-2,3-dihydro-5 - ethoxybenzofuran, 2 - bromomethyl-2,3-dihydro-7-methoxybenzofuran, 2 - bromomethyl-2,3-dihydro - 5 - chlorobenzofuran and 2-bromomethyl - 2,3 - dihydro-5-bromobenzofuran.

The primary phenoxyalkyl amines used in the process of the present invention when employing the 2-halomethyl-2,3-dihydrobenzofurans may have the substituents $R^1$ and $R^2$ present in any positions in the benzene ring and these substituents may be disposed in the same manner as indicated above with respect to the phenoxyalkyl halides. Examples of such phenoxyalkylamines include β-phenoxyethylamine, β - (2 - methoxy-phenoxy)-ethylamine, β - (2,3 - dimethoxyphenoxy)ethylamine, β-(2,6-dimethoxyphenoxy)ethylamine, β-(4 - methoxy-phenoxy)-ethylamine, γ-phenoxypropylamine, β - (2 - methylphenoxy)ethylamine, β - (2 - fluorophenoxy)ethylamine and δ-phenoxy-n-butylamine.

The compounds of the present invention are, as indicated above, readily obtained as the hydrohalides when the selected reactants are heated together in equimolar proportions. No solvent is necessary but one may be used if desired. The reactants are heated at a temperature at which at least one is liquid. Suitable solvents include cyclic ethers such as dioxane and ether alcohols such as 2-ethoxy-ethanol. It is, however, recommended to use at least two moles of the primary amine reactant for each mole of compound containing a terminal halogen atom in the side chain, i.e. the phenoxyalkyl halide of 2-halomethyl-2,3-dihydrobenzofuran. Lesser proportions of primary amine give rise to marked amounts of tertiary amines. The crude reaction products may be decomposed and worked up as indicated above.

The compounds of the present invention when administered intravenously to the anaesthetised rat in doses of substantially 1 mg./kg. bodyweight bring about a fall in blood pressure of 40 to 90%: this dose is capable of abolishing or inhibiting the pressor response to adrenaline. A similar fall in blood pressure was achieved upon oral administration, the doses being substantially 40 mg./kg bodyweight to rats rendered hypertensive to renal occlusion. In the isolated rabbit intestine, using the Finkleman technique a concentration of 3.5 mg./ml. inhibited the stimulation of the periarterial nerves and oxogenous adrenaline, thus demonstrating that these compounds possess adrenolytic and adrenergic blocking properties.

The dihydrobenzofurans of the present invention may be administered in the form of tablets, capsules or suppositories or by the intravenous route.

Tablets may be formulated with any of the customary excipients such as maize starch or lactose, with a binder such as a starch mucilage or dextrin, methyl cellulose or sodium alginate and with a lubricant such as talc, stearic acid or magnesium stearate. A typical formulation is as follows:

| | Mgm. |
|---|---|
| Dihydrobenzofuran derivative | 25 |
| Lactose | 150 |
| Maize starch B.P. | 69 |
| Talc B.P.C. | 2.5 |
| Stearic acid | 1.0 |
| Dextrin | 2.5 |

Capsules may also be formulated each containing a predetermined quantity of dihydrobenzofuran derivative together with an excipient, a binder and a lubricant within a water-soluble casing. The excipient, binder and lubricant may be any of those which may be used in the above described tablet formulations. Each capsule may contain 25 mgm. of dihydrobenzofuran derivative and the casing may be made of gelatine.

For intravenous injection the dihydrobenzofuran derivative in the form of the hydrochloride or other salt with a pharmacologically acceptable acid may be dissolved in water to produce, for example, a 1% by weight solution and predetermined quantities of the solution then sealed into ampoules or vials which are subsequently sterilised by heating in an autoclave following the method described in the British Pharmacopeia 1958, page 7326, or by subjecting to the action of gamma radiation.

When it is desired to administer the dihydrobenzofurans of the present invention by the anal route, suppositories may be formulated with an oleaginous or with a non-oleaginous base. An oleaginous base may comprise soft paraffin admixed with hard paraffin. Other ingredients may include lanolin, white beeswax and cetostearyl alcohol. Examples of such bases are Paraffin Ointment B.P. and Simple Ointment B.P. A suitable non-oleaginous base is a mixture of polyethylene glycols of different molecular weights, for example, a mixture of polyethylene glycols having average molecular weights of 1500 and 4000. Additional ingredients such as cetyl alcohol and cetostearyl alcohol may be present in such a formulation. An example of a suitable non-oleaginous base is Polyethylene Glycol Ointment U.S.P. XV. A typical formulation for a suppository containing a compound of the present invention is:

| | | |
|---|---|---|
| Polyethylene glycol 4000 | gms | 750 |
| Polyethylene glycol 1500 | gms | 150 |
| Dihydrobenzofuran derivative | gms | 12.5 |
| Distilled water | ml | 100 |

The two polyethylene glycols are melted together at a temperature not exceeding 50° C. The dihydrobenzofuran derivative in the form of the hydrochloride is dissolved in the distilled water and the resulting solution thoroughly incorporated into the molten mixture. This mixture is then cast into pessary moulds so as to produce pessaries each weighing 4 gms. and containing 50 mgm. of the dihydrobenzofuran derivative.

Particularly effective are those compounds containing at least one alkoxy substituent, especially methoxy, in an ortho position in the phenoxy ring. Particular interest also attaches to those compounds containing an alkoxy substituent, especially a methoxy or ethoxy group, in the 7-position in the benzofuran nucleus.

The following examples illustrate the nature of the invention.

Example 1.—2-(2'-[2''methoxyphenoxy]ethyl)aminomethyl-2,3-dihydrobenzofuran 2-aminomethyl-2,3-dihydrobenzofuran (29.8 g.) and 2-(2'-methoxyphenoxy)ethyl chloride (18.65 g.) were heated at 160° C. for one hour. The mixture was cooled, diluted with chloroform (60 mls.) and a solution of potassium carbonate (14 g.) in water (40 mls.) then added. The chloroform layer was separated and the aqueous layer extracted twice with chloroform (20 mls. each time). The extracts were combined and dried over anhydrous sodium sulphate. Filtration, followed by distillation gave the product (yield 17.3 g.) as a pale yellow oil which solidified on standing overnight. The hydrochloride, prepared by treating a solution of the base in isopropanol with anhydrous hydrogen chloride, is obtained as white crystals having a melting point of 116 to 118° C.

Example 2.—2-(2'-[2'',6''-dimethoxyphenoxy]ethyl) aminomethyl-2,3-dihydrobenzofuran 2-aminomethyl-2,3-dihydrobenzofuran (29.8 g.) and 2-(2',6'-dimethoxyphenoxy)ethyl chloride (21.65 g.) were heated at 160° C. for one hour and the product isolated as described in Example 1. 2-(2'-[2'',6''-dimethoxy-phenoxy]-ethyl)aminomethyl-2,3-dihydrobenzofuran was isolated as a pale yellow oil, boiling point 222 to 228° C./1.4 mm. which solidified on cooling.

The hydrochloride, prepared by treating a solution of the base in isopropanol with anhydrous hydrogen chloride was obtained as white crystals having a melting point of 121 to 123° C.

Example 3.—2-(2′-[2″,6″-dimethoxyphenoxy]ethyl)
aminomethyl-2,3-dihydro-6-methylbenzofuran 2-bromomethyl-2,3-dihydro-6-methylbenzofuran (22.7 g.) and 2-(2′,6′-dimethoxyphenoxy)ethylamine (39.4 g.) were heated at 160° C. for 2 hours and the product isolated as described in Example 1. 2-(2′-[2″,6″-dimethoxyphenoxy]ethyl)-aminomethyl-2,3-dihydro-6 - methylbenzofuran (14.9 g.) was thus isolated as a pale yellow oil, boiling point 226–232° C./0.6 mm.

The hydrochloride prepared in the manner described in Example 1 and then crystallised from a 50/50 isopropyl alcohol/diisopropyl ether mixture was obtained as white crystals, melting point 136–139° C.

Analysis.—Calculated for $C_{20}H_{26}ClO_4N$: C, 63.24%; H, 6.90%; Cl, 9.33%. Found: C, 62.91%; H, 6.76%; Cl, 9.53%.

Example 4.—2-(2′-[2″,6″-dimethoxyphenoxy]ethyl)
aminomethyl-2,3-dihydro-7-methylbenzofuran 2-bromomethyl-2,3-dihydro-7 - methylbenzofuran (18 g.) and 2-(2′,6′-dimethoxyphenoxy)ethylamine (31.3 g.) were heated at 160° C. for 2 hours and the product isolated as described in Example 1. 2-(2′-[2″,6″-dimethoxyphenoxy]ethyl)aminomethyl-2,3-dihydro-7 - methylbenzofuran (10.9 g.) was thus obtained as a pale yellow oil, boiling point 215–225° C./0.8 mm.

The hydrochloride prepared in the manner described in Example 1 and then crystallised from a 50/50 isopropyl alcohol diisopropyl ether mixture was obtained as white crystals, melting point 142–144° C.

Analysis.—Calculated for $C_{20}H_{26}ClNO_4$: N, 3.69%; Cl, 9.33%. Found: N, 3.46%; Cl, 9.65%.

Example 5.—2-(2′-phenoxyethyl)aminomethyl-2,3-dihydro-7-methoxybenzofuran 2-bromomethyl-2,3-dihydro-7-methoxybenzofuran (12.1 g.) and beta-phenoxyethylamine (13.7 g.) were heated at 150° C. for 1 hour followed by working up as described in Example 1. 2-(2′phenoxyethyl)aminomethyl-2,3-dihydro-7-methoxybenzofuran (7.7 g.) was isolated as a yellow oil, boiling point 206–212° C./0.6–0.9 mm.

The hydrochloride, prepared as described in Example 1, crystallised from isopropyl alcohol as white crystals having a melting point of 167–170° C.

Analysis.—Calculated for $C_{18}H_{22}ClNO_3$: C, 64.40%; H, 6.61%; Cl, 10.56%. Found: C, 64.18%; H, 6.52%; Cl, 10.73%.

Example 6.—2-(2′-[2″-methoxyphenoxy]ethyl)aminomethyl-2,3-dihydro-7-methoxybenzofuran 2-bromomethyl-2,3-dihydro-7-methoxybenzofuran (18.2 g.) and 2-(ortho-methoxyphenoxy)ethylamine (25.1 g.) were heated at 150° C. for 1 hour and then worked up as described in Example 1. (2′-[2″-methoxyphenoxy]ethyl)-aminomethyl-2,3-dihydro-7-methoxybenzofuran (11.8 g.) was obtained as a viscous yellow oil, boiling point 220–228° C./0.02–0.05 mm.

The hydrochloride, prepared as described in Example 1, crystallised from isopropyl alcohol as white crystals having a melting point of 125–126° C.

Analysis.—Calculated for $C_{19}H_{24}ClNO_4$: N, 3.83%; Cl, 9.69%. Found: N, 3.99%; Cl, 9.82%.

Example 7.—2-(2′-[2″,6″-dimethoxyphenoxy]ethyl)-
aminomethyl-2,3-dihydro-7-methoxybenzofuran 2-bromomethyl - 2,3 - dihydro-7-methoxybenzofuran (18.2 g.) and 2-(2′,6′ - dimethoxyphenoxy)ethylamine (29.6 g.) were heated at 150° C. for 1 hour and then worked up as described in Example 1. 2-(2′-[2″,6″-dimethoxyethyl)-aminomethyl - 2,3 - dihydro-7-methoxybenzofuran (6 g.) was obtained as a viscous yellow oil, boiling point 220–226° C./0.4–1.0 mm.

The hydrochloride, prepared as described in Example 1, crystallised from isopropyl alcohol as white crystals having a melting point of 139–140° C.

Analysis.—Calculated for $C_{20}H_{26}ClNO_5$: C, 60.67%; H, 6.62%; Cl, 8.96%. Found: C, 60.89%; H, 6.72%; Cl, 9.16%.

Example 8.—2-(2′-[2″-methoxyphenoxy]ethyl)aminomethyl-2,3-dihydro-7-ethoxybenzofuran 2 - bromomethyl - 2,3 - dihydro-7-ethoxybenzofuran (14.6 g.) and 2-(ortho-methoxyphenoxy)ethylamine (31 g.) were heated for 1 hour at 160° C. Working up as described in Example 1 gave (2′-[2″-methoxyphenoxy]-ethyl)aminomethyl - 2,3 - dihydro-7-ethoxybenzofuran (10.4 g.) as a viscous yellow oil, boiling point 218–220° C./0.2–0.3 mm. On standing the oil rapidly solidified.

The hydrochloride, prepared as described in Example 1, crystallised from ethanol as white crystals having a melting point of 169–172° C.

Analysis.—Calculated for $C_{20}H_{26}ClNO_4$: C, 63.24%; H, 6.90/; Cl, 9.34%. Found: C, 63.20%; H, 7.05%; Cl, 9.17%.

Example 9.—2-(2′-[2″,6″-dimethoxyphenoxy]ethyl)-
aminomethyl-2,3-dihydro-7-ethoxybenzofuran 2 - bromomethyl - 2,3 - dihydro-7-ethoxybenzofuran (19.3 g.) and 2-(2′,6′ - dimethoxyphenoxy)ethylamine (29.6 g.) were heated at 150° C. for 1 hour. Working up as described in Example 1 gave 2-(2′-[2″,6″-dimethoxyphenoxy]ethyl)aminomethyl - 2,3 - dihydro-7-ethoxybenzofuran (11.9 g.) as a viscous yellow oil, boiling point 220–240° C./0.2–0.3 mm.

The hydrochloride, prepared as described in Example 1, crystallised from isopropyl alcohol as white crystals having a melting point of 114–116° C.

Analysis.—Calculated for $C_{21}H_{28}ClNO_5$: C, 61.52%; H, 6.88%; Cl, 8.65%. Found: C, 61.28%; H, 7.04%; Cl, 8.90%.

Example 10.—2-(2′-[2″-fluorophenoxy]ethyl)aminomethyl-2,3-dihydro-7-methylbenzofuran 2 - aminomethyl - 2,3 - dihydro-7-methylbenzofuran (16.8 g.) and beta-(2-fluorophenoxy)ethyl chloride (8.7 g.) were heated at 150° C. for 2 hours. Working up as described in Example 1 gave 2-(2′-[2″-fluorophenoxy]-ethyl)aminomethyl-2,3-dihydro-7-methylbenzofuran (6.6 g). as a yellow oil, boiling point 180–184° C./0.2 mm.

The hydrochloride, prepared as described in Example 1, crystallised from methanol as white crystals having a melting point of 182–183.5° C.

Analysis.—Calculated for $C_{18}H_{21}FClNO_2$: C, 64.01%; H, 6.27%; Cl, 10.50%. Found: C, 63.66%; H, 6.55%; Cl, 10.81%.

Example 11.—2-(2′-[2″,3″-dimethoxyphenoxy]ethyl)-
aminomethyl-2,3-dihydrobenzofuran 2-aminomethyl-2,3-dihydrobenzofuran (17.6 g.) and 2-(2′,3′-dimethoxyphenoxy)ethyl chloride (12.7 g.) were heated at 150° C. for 2 hours. Working up as described in Example 1 gave 2-(2′-[2″,3″-dimethoxyphenoxy]-ethyl)aminomethyl-2,3-dihydrobenzofuran (12.4 g.) as a yellow oil, boiling point 205–206° C./0.2 mm.

The hydrochloride, prepared as described in Example 1, crystallised from ethanol as white crystals having a melting point of 161–163° C.

Analysis.—Calculated for $C_{19}H_{24}ClNO_4$: C, 62.37%; H, 6.61%; Cl, 9.69%. Found: C, 62.58%; H, 6.40%; Cl, 9.92%.

Example 12.—2-(2′-phenoxyethyl)aminomethyl-
2,3-dihydrobenzofuran 2-aminomethyl-2,3-dihydrobenzofuran (29.8 g.) and beta-phenoxyethyl bromide (20.1 g.) were heated at 160° C. for 1 hour. Working up as described in Example 1 gave 2-(2′-phenoxyethyl)aminomethyl - 2,3 - dihydrobenzofuran (18.5 g.) as a colourless oil, boiling point 183–188° C./0.4 mm.

The hydrochloride, prepared as described in Example 1, crystallised from methanol as white crystals having a melting point of 220–223° C.

*Analysis.*—Calculated for $C_{17}H_{20}ClNO_2$: C, 66.78%; H, 6.59%; Cl, 11.60%. Found: C, 66.85%; H, 6.66%; Cl, 11.35%.

Example 13.—2-(2'-[2'',6''-dimethylphenoxy]ethyl)-aminomethyl-2,3-dihydro-7-methoxybenzofuran 2-bromomethyl - 2,3 - dihydro-7-methoxybenzofuran (24.3 g.) and 2-(2',6'-dimethylphenoxy)ethylamine (33 g.) were heated at 150° C. for 1 hour. Working up as described in Example 1 gave 2-(2'-[2'',6'' - dimethylphenoxy]ethyl)aminomethyl - 2,3 - dihydro-7-methoxybenzofuran (17.6 g.) as a viscous yellow oil, boiling point 214–217° C./0.7 mm.

The hydrochloride, prepared as described in Example 1, crystallised from isopropyl alcohol as white crystals having a melting point of 164–166° C.

*Analysis.*—Calculated for $C_{21}H_{26}ClNO_3$: C, 66.01%; H, 7.20%; Cl, 9.74%. Found: C, 65.68%; H, 6.97%; Cl, 10.09%.

Example 14.—2-(2'-[4''-methylphenoxy]ethyl)-aminomethyl-2,3-dihydro-5-chlorobenzofuran 2 - aminomethyl - 5 - chloro-2,3-dihydrobenzofuran (29.3 g.) and 2-(4'methylphenoxy)ethyl chloride (13.6 g.) were heated at 150° C. for 2 hours. Working up as in Example 1 gave 2-(2'-[4'' - methylphenoxy]ethyl)-aminomethyl-2,3-dihydro-5-chlorobenzofuran (15.8 g.) as a pale yellow solid, boiling point 220–224° C./0.8 mm.

The hydrochloride, prepared as described in Example 1, crystallised from methanol as white crystals having a melting point of 252–254° C.

*Analysis.*—Calculated for $C_{18}H_{21}Cl_2NO_2$: C, 61.02%; H, 5.97%; Cl, 20.00%. Found: C, 61.20%; H, 5.97%; Cl, 20.41%.

Example 15.—2-(3'-phenoxy-n-propyl)aminomethyl-2,3-dihydro-7-methoxybenzofuran 2-aminomethyl - 7 - methoxy - 2,3 - dihydrobenzofuran (18.0 g.) and 3-phenoxy-n-propylbromide (10.8 g.) were heated at 150° C. for 2 hours. Working up as described in Example 1 gave 2-(3'-phenoxypropyl)aminomethyl-2,3-dihydro-7-methoxybenzofuran (9.5 g.) as a pale yellow oil, boiling point, 210–215° C./1 mm.

Example 16.—2-(4'-phenoxy-n-butyl)aminomethyl-2,3-dihydrobenzofuran

2 - aminoethyl - 2,3 - dihydrobenzofuran (14.9 g.) and 4-phenoxy-n-butyl chloride (9.23 g.) were heated at 150° C. for 2 hours. Working up as described in Example 1 gave 2 - (4' - phenoxy-n-butyl)aminomethyl-2,3-dihydrobenzofuran (6.5 g.) as a colourless oil, boiling point, 195–200° C./0.5 mm.

The compounds of the invention are useful in the treatment of high blood pressure in mammals, dosages being within the range from one to forty mg. per kg. of body weight once or more times per day.

We claim:

1. A compound selected from the group of a 2-substituted 2,3-dihydrobenzofuran having the formula

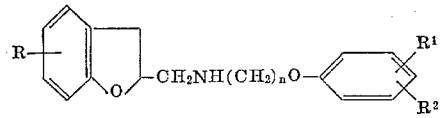

in which each of R, $R^1$ and $R^2$ is selected from the group consisting of hydrogen, halogen having an atomic number greater than 8 but less than 36, alkyl having 1 to 6 carbon atoms and alkoxy having 1 to 6 carbon atoms, $n$ is an integer greater than one but less than seven, and acid addition salts thereof.

2. The compound claimed in claim 1 in which at least one of the substituents $R^1$ and $R^2$ is an alkoxy group which is present in ortho position in the benzene ring.

3. The compound claimed in claim 2, in which both of the groups $R^1$ and $R^2$ are present in the ortho positions in the benzene ring.

4. The compound claimed in claim 1, in which the substituent R is an alkoxy group present in the 7-position in the dihydrobenzofuran ring.

5. A compound selected from the group of 2-substituted 2,3-dihydrobenzofurans as claimed in claim 1, in which R is a hydrogen atom and $R^1$ and $R^2$ are methoxy groups respectively present in the 2- and 6-positions in the benzene ring, and the hydrochloride thereof.

6. A compound selected from the group of 2-substituted 2,3-dihydrobenzofurans as claimed in claim 1, in which R is a methyl group present in the 6-position in the benzofuran nucleus and $R^1$ and $R^2$ are methoxy groups respectively present in the 2- and 6-positions in the benzene ring, and the hydrochloride thereof.

7. A compound selected from the group of 2-substituted 2,3-dihydrobenzofurans as claimed in claim 1, in which R is a methyl group present in the 7-position in the benzofuran nucleus and $R^1$ and $R^2$ are methoxy groups respectively present in the 2- and 6-positions in the benzene ring, and the hydrochloride thereof.

8. A compound selected from the group of 2-substituted 2,3-dihydrobenzofurans as claimed in claim 1, in which R is a methoxy group present in the 7-position in the benzofuran nucleus and $R^1$ and $R^2$ are methoxy groups respectively present in the 2- and 6-positions in the benzene ring, and the hydrochloride thereof.

9. A compound selected from the group of 2-substituted 2,3-dihydrobenzofurans as claimed in claim 1, in which R is an ethoxy group present in the 7-position in the benzofuran nucleus and $R^1$ and $R^2$ are methoxy groups respectively present in the 2- and 6-positions in the benzene ring, and the hydrochloride thereof.

10. A compound selected from the group of 2-substituted 2,3-dihydrobenzofurans as claimed in claim 1, in which R is a hydrogen atom and $R^1$ and $R^2$ are methoxy groups respectively present in the 2- and 3-positions in the benzene ring, and the hydrochloride thereof.

References Cited

Scarlata et al.: Chem. Abstracts, vol. 65 (1966), p. 673.

ALEX MAZEL, Primary Examiner

B. I. DENTZ, Assistant Examiner

U.S. Cl. X.R.

424—285